United States Patent [19]

Bschorr

[11] 4,275,801
[45] Jun. 30, 1981

[54] NOISE AND HEAT INSULATING STRUCTURAL COMPONENT

[75] Inventor: Oskar Bschorr, Munich, Fed. Rep. of Germany

[73] Assignee: Messerschmitt-Boelkow-Blohm Gesellschaft mit beschrankter Haftung, Munich, Fed. Rep. of Germany

[21] Appl. No.: 67,219

[22] Filed: Aug. 17, 1979

[30] Foreign Application Priority Data

Sep. 1, 1978 [DE] Fed. Rep. of Germany ....... 2838193

[51] Int. Cl.³ .......................... E04B 1/88; E04B 2/02; E04C 2/54
[52] U.S. Cl. ..................................... 181/290; 52/144; 52/789; 181/289
[58] Field of Search ............................... 181/289–292; 52/144–145, 171, 788–790; 428/34

[56] References Cited

U.S. PATENT DOCUMENTS 4,167,598  9/1979  Logan et al. ..................... 181/290 X

FOREIGN PATENT DOCUMENTS 1817569  8/1969  Fed. Rep. of Germany ............ 52/789
2308772 11/1976  France ...................................... 52/788
 594274  2/1978  U.S.S.R. .................................... 52/790

Primary Examiner—L. T. Hix
Assistant Examiner—Thomas H. Tarcza
Attorney, Agent, or Firm—W. G. Fasse; D. F. Gould

[57] ABSTRACT

The present noise and heat insulating structural component may form a wall panel or a window element if the component is made of transparent material. Between two substantially parallel outer walls there is arranged at least one auxiliary damping wall forming a plurality of evacuated pockets each having a vaulted or domed surface when the auxiliary wall is substantially free of a load condition. The auxiliary wall may be secured to one or both of the outer walls, for example, by adhesive. Alternatively the auxiliary damping wall may be secured to a further inner wall member or it may be held in position only at its edges substantially intermediate between the outer walls.

10 Claims, 9 Drawing Figures

NOISE AND HEAT INSULATING STRUCTURAL COMPONENT

BACKGROUND OF THE INVENTION

The invention relates to a noise and heat insulating structural component. More specifically, such structural components may be wall sections or windows if the component is made of transparent material.

The prior art comprises many possibilities for the noise and heat insulation of wall surfaces and window surfaces. For example, it is customary to cover wall elements with additional layers of structural materials secured to the wall elements such as mats of bituminous material, glass fiber mats arranged in several layers and in combination with damping or insulating panels.

As far as the heat and noise insulation is concerned, the windows of buildings are considered to be the actual weak spots because heat loss is primarily caused by the small heat insulation characteristic of the windows. The insulations additionally arranged along the interface between the window sash frame and the wall are relatively ineffective. Thus, a noise insulation for keeping the noise level low is very limited for the window areas and actually rather minimal if at all present. It has been suggested to improve the noise and heat insulation by means of so-called multiple pane windows. So-called noise protection windows require a large structural depth and the weight per surface area is so large that it is not possible to construct these windows as windows that may be opened. Prior art efforts toward achieving noise and heat insulating surface areas have heretofore resulted in rather large expense in terms of material and space.

OBJECTS OF THE INVENTION

In view of the above it is the aim of the invention to achieve the following objects singly or in combination:

to remove the drawbacks or disadvantages of the prior art, more specifically, to provide a wall and window structural component which has a substantially higher noise and heat insulating characteristic as compared to prior art components while simultaneously requiring only a small increase in the structural weight and in the structural depth;

to construct a wall or window panel in such a manner that it will have simultaneously a high noise damping efficiency as well as a high heat transfer resistance;

to increase the noise damping characteristic by minimizing the thickness of the walls of the damping element;

to increase the heat insulating effect by substantially reducing the passage surface areas;

to provide noise damping and heat insulating means which may be installed even after the windows proper have been previously installed; and to provide a structural component which has high noise damping as well as high heat insulating characteristics and which simultaneously is suitable for making many different structural components, such as windows, doors, cover shells, lightweight wall panels, vehicle bodies, and the like.

SUMMARY OF THE INVENTION

According to the invention there is provided a wall and/or window structural component having a high noise and heat insulation which is characterized in that auxiliary surface members which are domed or vaulted when under substantially no load condition, are arranged in the hollow space between two, preferably parallel, outer wall elements. The vaulted or domed auxiliary surface members form evacuated pockets inside the space between the outer wall elements.

The outer wall elements and the auxiliary wall members forming the evacuated, vaulted pocket volumes may be made of glass, wood, sheet metal, compound materials and/or synthetic materials. The auxiliary wall members contact one or both of the outer wall elements, however, the contact surface area is minimized and spacer components are inserted between the auxiliary wall members and the outer wall elements. The spacing may be provided by washer type inserts, by a layer of adhesive, by an increased material thickness provided at the edges of the auxiliary surface members or by the formation of a crimping or an off-set bulge at the edges of the auxiliary surface members. Preferably the spacer elements have a very poor heat conductivity or rather a good heat insulation characteristic. The noise and heat insulation characterisic of the pocket volumes formed by the auxiliary domed or vaulted surface members may be adjusted by the selection of the material of which these auxiliary surface members are made and/or by the introduction of a small quantity of liquids into each of these pockets.

BRIEF FIGURE DESCRIPTION

In order that the invention may be clearly understood, it will now be described, by way of example, with reference to the accompanying drawings, wherein:

FIG. 1b is a top plan view of the embodiment illustrated in FIG. 1a;

DETAILED DESCRIPTION OF PREFERRED EXAMPLE EMBODIMEMTS AND OF THE BEST MODE OF THE INVENTION

According to the invention a combined noise and heat insulation is accomplished by means of the evacuated or reduced pressure pockets in the form of a plurality of auxiliary surface members 3. Hereafter, the surface members will, for simplicity, be referred to as pockets. The walls forming these pockets are constructed as so-called bulge or buckling surfaces. These surfaces or wall members are so dimensioned that they have a rather small spring constant relative to the load caused by the pressure difference between the atmospheric, surrounding pressure and the vacuum or reduced pressure in the pockets. Thus, such elements may be compared in their function to so-called Belleville springs. It is a feature of such springs that they comprise bulges in their surface areas. The height or depth of such bulges is preferably within the range of 0.5 to 3.0 times the thickness of the walls or surfaces forming such springs, whereby the desired load condition with a small spring constant is achieved. Generally it may be said that the shape of the bulging or buckling area of the surface is relatively insignificant for the purpose to be achieved. Spherical Belleville springs or conical Belleville springs have qualitatively a similar spring characteristic. This also applies to all shapes having a monotonous buckling or bulging characteristic. Springs having a shape of rotational symmetry also exhibit the desired spring characteristics.

By evacuating the pocket volumes, a direct heat conduction is avoided. The walls forming the pockets provide a longer heat conduction path having a relatively small cross sectional area whereby a substantially larger heat resistance is achieved. The spring stiffness and the dimensions of the pocket volume form in combination a resonance system which is subject to an impedance break at its resonance frequency, whereby an increased noise insulation is achieved. In order to optimize this noise damping or insulation it is suitable to minimize the thickness of the walls forming the vaulted or domed pockets. In order to protect the pocket walls against mechanical contact, the pockets are secured to the inner surfaces of double pane windows, for example.

Windows having a high noise insulation factor, are frequently subject to leaks around the window frames and these leaks determine the insulation or damping that may be achieved. According to the invention the passage of noise may be reduced substantially by means of edge joints by operatively connecting these edge joints to the space between the two panes of a double pane window. The pocket walls with the low impedance at resonance secured to the inner surface or surfaces of the double window panes provide an increased damping action through the leaks in the gap joints.

Figure 1A:
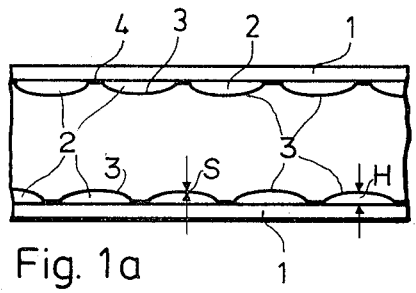
FIG. 1a is a sectional view along the section line 1—1 in FIG. 1b, whereby the cross hatching has been intentionally omitted since the structural components may be made of many different materials.
Figure 1B:
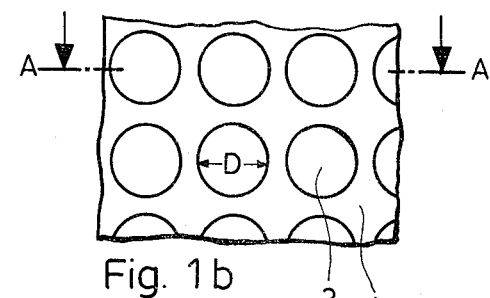
Figure 2A:
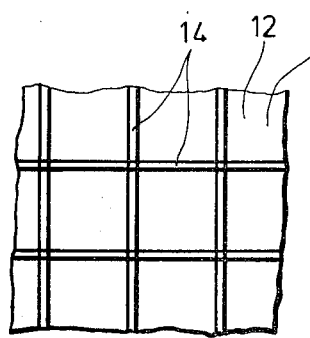
FIG. 2a is a top plan view onto a structural component in which the vaulted or domed auxiliary wall or surface members have a square base configuration.

FIGS. 1a and 1b show a basic embodiment of a noise and heat damping or insulating wall or window component according to the invention. For example, a double pane window is illustrated comprising two window panes one spaced from the other in a conventional manner. To the inside surface of each window pane 1 there is secured a thin walled, glass pane 3 each of which forms a plurality of vaulted or domed pockets 2. This vaulted or domed shape is maintained as long as the window panes 3 are not subject to any load. As shown in FIG. 1b the window panes 3 or rather the pockets have a circular base configuration and the volumes of the pockets 2 are evacuated. The base configuration of the pockets may have different shapes, for example, a square shape as shown in FIG. 2a, or a rectangular shape, or a hexagonal or triangular shape. Any other geometric shapes are also suitable.

The vaulting or dome shape and the span width or diameter of the individual glass panes 3 are so selected relative to the pressure load that a low spring stiffness is accomplished. Depending on the module of elasticity of the material of which the panes 3 are made, it has been found suitable to shape the vaults or domes so that the vaulting height H corresponds to about 0.5 to about 3.0 times the wall thickness S whereas the diameter D corresponds to about 10 to about 300 times the wall thickness.

According to the invention spacer members 4 are located where the vaulted panes 3 contact the outer panes 1. These spacers 4 are required because due to the reduced pressure inside the pockets 2, the panes 3 bend so that in the range of the desired low spring constant the panes 3 are almost plain. Different means may be employed to provide the desired spacing. For example, a layer of adhesive between the panes 1 and 3 may provide the sufficient spacing. On the other hand, the panes 3 may be provided with a thickened portion or a crimped shoulder at the points 4. Also the arrangement of intermediate spacer elements having the desired thickness is possible.

The noise damping of the above described construction may be explained directly as the result of the low spring stiffness, namely, the high compressibility of the volumes of the pockets 2. Due to this feature the thickness resonance may be reduced and the individual panes 3 operate as resonators which exhibits an impedance break in the range of their resonance frequencies. Such impedance break resulting in a sudden substantially increased impedance against the passage of noise. As is known, the damping of noise depends on the size of the impedance difference.

For the simultaneous heat insulation, the structure according to the invention substantially reduces the passage areas. Due to the evacuated pocket volumes 2 heat passage may take place merely through the contact points or surfaces 4. In the embodiment of FIGS. 1a and 1b the pockets 2 have a circular base configuration and the circular bases are separated from each other.

Figure 2B:
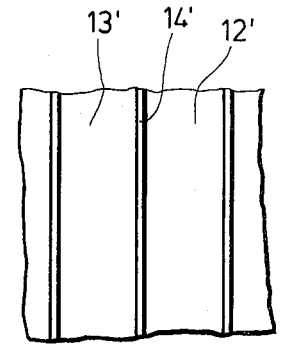
FIG. 2b is a view similar to that of FIG. 2a, however with the auxiliary surface members forming longitudinal, substantially rectangular pockets.
Figure 2C:
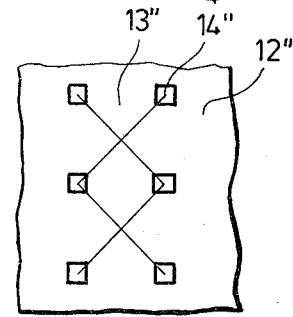
FIG. 2c is a view again similar to that of FIG. 2a, however, with the auxiliary, pocket forming surface members connected to the respective outer wall elements only at certain points so that the individual volumes of the pockets are interconnected.

However, the same effect may be achieved with other base configurations such as triangular, rectangular, or hexagonal base configurations. FIG. 2a provides an example for a rectangular base configuration of the pocket volumes 12. In FIG. 2b the pockets 12' have a longitudinal strip configuration. The glass surfaces 13' are domed or vaulted only relative to one axial direction, namely, the longitudinal axial direction. The vaulted or domed glass surfaces 13' are secured to the outside wall member along strip shaped support areas 14'. In FIG. 2c the glass surface area 13" are vaulted relative to two axes and the respective surfaces are connected to the outside wall member 12" only at contact points 14". The side edges being sealed in a vacuum-tight manner on all sides.

Figure 3:
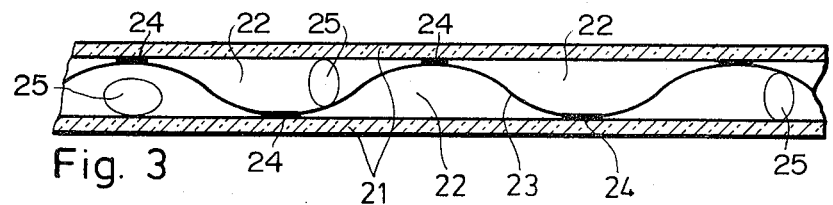
FIG. 3 is a sectional view similar to that of FIG. 1 but showing a double pane window with the pockets forming auxiliary wall members according to the invention.

In the embodiment of FIG. 3 the space between the outside panel members or panes 21 is evacuated. The glass pane 23 is domed or corrugated as shown under no load conditions. The domed or corrugated pane 23 rests against or bears against the outer window panes 21 through spacers 24 constituting bearing points. The spaces 22 are evacuated whereby the glass surface or pane 23 is subject to a load as a buckling surface. If this buckling surface is respectively dimensioned, it provides a low spring stiffness, whereby an improved noise damping is accomplished while simultaneously providing an improved heat insulation due to reducing the contact surface areas at the spacer or bearing points 24.

Figure 4:
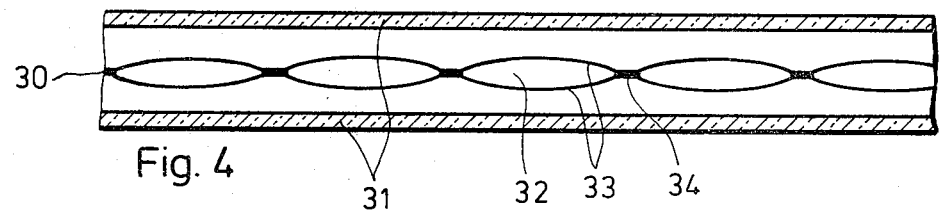
FIG. 4 is a view similar to that of FIG. 3 showing a modified double pane window in which the pocket forming wall members are not connected to the window panes.

FIG. 4 shows an example embodiment of a double pane window of conventional construction in which the features of the invention have been incorporated after installation of the two window panes 31 of which at least the inner pane is separately removable. Vaulted or domed window panes 33 are connected at 34 to form a plurality of evacuated pockets 32. The two domed panes 33 thus form a separate structural unit 30 which is secured in position intermediate the two outer wall or pane panels 31. The individual domed elements of the panes 33 may have the shape and the base configurations mentioned above and also shown, for example, with a circular base in FIG. 1b. The structural unit 30 may be held in position along lateral frame members not shown. The noise and heat insulation is analogous to the example embodiment shown in FIGS. 1 and 2.

Figure 5:
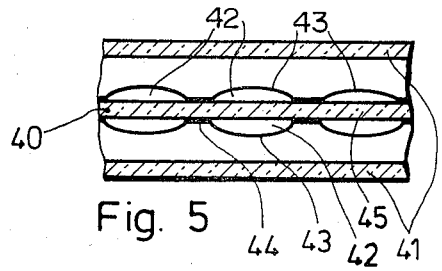
FIG. 5 shows a sectional view through a triple pane window in which the auxiliary, pocket forming wall members according to the invention are secured to the inner window pane.

In the embodiment of FIG. 5 a structural unit 40 is formed by an inner window pane 45 having secured to both of its outer surfaces domed or vaulted panes 43 forming pockets 42 which are evacuated. The connection of the panes 43 to the inner pane 45 may be accomplished, for example, by an adhesive at the contact points 44. The structural unit 40 is held in position between the outer window panes 41 along a frame not shown. In the embodiment of FIG. 5 the pockets 42 and thus the vaulted or domed elements of the panes 43 are in register with each other.

Figure 6:
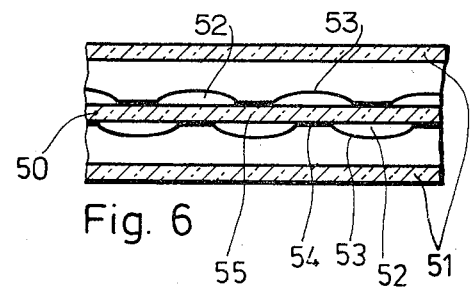
FIG. 6 is a view similar to that of FIG. 5 with a staggered arrangement of the auxiliary, pocket forming wall or surface members.

In the embodiment of FIG. 6 a structural unit 50 similar to that of unit 40 is formed by securing the panes 53 with the pockets 52 to an inner pane 55 at contact points 54. However, the pockets 52 in one pane are shifted relative to the pockets in the opposite panes so that pockets and contact points register with each other. The unit 50 is again held in position in the space between two outer panes 51. Due to the shift as just described it has been found, that the heat insulation characteristics are somewhat improved in the embodiment of FIG. 6 because the heat conduction path is longer than, for example, in FIG. 5 thus resulting in a larger insulation effect.

The described example embodiments according to the invention are primarily concerned with windows and are thus made of light transparent material, however, the same effect may be achieved when the structural components are made of non-transparent material for walls and the like. In wall components it is possible to further increase the heat insulation characteristic by providing the inner surfaces of the pockets with a heat reflecting coating thereby preventing heat conduction by radiation. Materials for the buckling, domed, or vaulted wall members may, for example, be selected from the group including sheet metal, glass fiber compound materials, carbon fiber compound materials, synthetic materials, ceramic materials and so forth whereby the type of use may range from doors to cover shells and light structural wall panels as well as components for vehicle bodies and the like.

In order to influence the resonating frequency of the domed or vaulted auxiliary surfaces 3, 13, and so forth, several possibilities are available. For example, by selecting the proper one from a large variety of available materials it is possible to take into account the natural damping factors of these materials. On the other hand, it is possible to select damping type of adhesives at the spacer points 4, 14, and so forth to thereby influence the damping characteristics of the entire strucuture. Furthermore, it is possible to insert liquid drops 25, for example, shown in FIG. 3 into the pockets 2, 12, 22, and so forth. The liquid drops should preferably contact the inner surface of the buckling auxiliary wall members 3, 13, 23, and so forth as well as the inner surfaces of the panels or panes 1, 11, 21, and so on, whereby an increased damping is achieved.

In order to increase the heat passage resistance, the spacer members at the points 4, 14, and so on are made of a material having a poor heat conductivity. Suitably, these contact points have a surface area as narrow as possible. Further, the resonance frequencies of the vaulted or domed auxiliary surface or wall members 3, 13, 23, may be influenced by the manufacturing tolerances, especially of the dimensions and the vaulting. These variables may be selected or controlled so that the resonance frequency may be located anywhere within a wide range of suitable frequencies. Thus, the invention has provided a wall and/or window structural component, the noise and heat insulating characteristics have been substantially improved by relatively simple means.

Although the invention has been described with reference to specific example embodiments, it will be appreciated, that it is intended to cover all modifications and equivalents within the scope of the appended claims.

What is claimed is:

1. A noise and heat insulating structural component, comprising two outer wall means spaced to form a hollow space therebetween, a plurality of auxiliary load buckling surface members which are domed when substantially free of a load and which buckle when subject to a load, said domed auxiliary load buckling surface members being located between said outer wall means, said auxiliary load buckling surface members enclosing a plurality of evacuated pockets each having a respective volume, said load buckling auxiliary surface members having a given wall thickness and a dome height corresponding substantially to 0.5 to 3.0 times said given wall thickness, whereby the so formed pockets form so-called Belleville type springs having a small spring constant relative to the load caused by the pressure difference between the pressure surrounding said pockets and the reduced pressure in said pockets.

2. The component of claim 1, wherein said two outer wall means extend in parallel to each other and wherein said two outer wall means and said auxiliary surface members are made of any one of the following materials namely glass, wood, sheet metal, compound materials, and synthetic materials.

3. The component of claim 1, wherein said domed auxiliary surface members have a geometric base configuration.

4. The component of claim 1, wherein said domed auxiliary surface members have strip configurations and means closing said strip configurations in a vacuum tight manner along the edges of said strip configurations.

5. The component of claim 1, wherein said auxialiary domed surface members have such a domed surface configuration that the volumes of the individual pockets are interconnected, and wherein said individual pockets comprise contact points resting against at least one of said outer wall means.

6. The component of claim 1, wherein said auxiliary domed surface members have differing dimensions and differing dome configurations.

7. The component of claim 1, further comprising points of contact between said outer wall means and said domed auxiliary surface members, and spacer means at said points of contact.

8. The component of claim 1, wherein said domed auxiliary surface members form a unit whereby said pockets are interconnected, said unit being operatively held in position between said outer wall means without contacting said outer wall means.

9. The component of claim 1, wherein the damping characteristic of said auxiliary domed surface members is adjustable or selectable.

10. The component of claim 1, further comprising spacer means between said outer wall means and said auxiliary domed surface members, said spacer means being made of heat insulating material.

* * * * *